(12) United States Patent
Kuo (10) Patent No.: US 10,085,241 B2
(45) Date of Patent: Sep. 25, 2018

(54) DEVICE OF REPORTING CONTROL INFORMATION

(71) Applicant: ACER INCORPORATED, New Taipei (TW)

(72) Inventor: Ping-Heng Kuo, New Taipei (TW)

(73) Assignee: ACER INCORPORATED, New Taipei (TW)

(*) Notice: Subject to any disclaimer, the term of this patent is extended or adjusted under 35 U.S.C. 154(b) by 5 days.

(21) Appl. No.: 14/922,187

(22) Filed: Oct. 25, 2015

(65) Prior Publication Data

US 2016/0135160 A1 May 12, 2016

Related U.S. Application Data

(60) Provisional application No. 62/076,484, filed on Nov. 7, 2014.

(51) Int. Cl.
| | |
|---|---|
| H04W 72/04 | (2009.01) |
| H04B 7/04 | (2017.01) |
| H04B 7/06 | (2006.01) |
| H04B 7/0456 | (2017.01) |

(52) U.S. Cl.
CPC ...... *H04W 72/0406* (2013.01); *H04B 7/0456* (2013.01); *H04B 7/0478* (2013.01); *H04B 7/065* (2013.01); *H04B 7/0647* (2013.01)

(58) Field of Classification Search
None
See application file for complete search history.

(56) References Cited

U.S. PATENT DOCUMENTS

| | | | |
|---|---|---|---|
| 2009/0207784 A1 | 8/2009 | Lee | |
| 2010/0202372 A1* | 8/2010 | Chun | H04L 5/0057 370/329 |
| 2013/0028129 A1 | 1/2013 | Chun | |
| 2013/0077580 A1 | 3/2013 | Kang | |
| 2013/0259151 A1 | 10/2013 | Thomas | |
| 2013/0301746 A1* | 11/2013 | Mobasher | H04B 7/0456 375/267 |
| 2013/0308715 A1 | 11/2013 | Nam | |
| 2014/0050280 A1 | 2/2014 | Stirling-Gallacher | |
| 2014/0064400 A1 | 3/2014 | Nammi | |
| 2014/0177683 A1 | 6/2014 | Krishnamurthy | |
| 2014/0266896 A1 | 9/2014 | Hyslop | |

(Continued)

FOREIGN PATENT DOCUMENTS

| | | |
|---|---|---|
| CN | 102237969 A | 11/2011 |
| CN | 102281128 A | 12/2011 |

(Continued)

*Primary Examiner* — Charles C Jiang
*Assistant Examiner* — Saad Khawar
(74) *Attorney, Agent, or Firm* — Winston Hsu (57) ABSTRACT

A communication device for reporting control information comprises a storage unit for storing instructions and a processing means coupled to the storage unit. The processing means is configured to execute the instructions stored in the storage unit. The instructions comprise receiving a first period for transmitting first antenna array dimension precoding information from a network; and receiving a second period for transmitting second antenna array dimension precoding information from the network, wherein the first period is different from the second period.

8 Claims, 8 Drawing Sheets

(56) References Cited

U.S. PATENT DOCUMENTS

| | | |
|---|---|---|
| 2014/0323144 A1 | 10/2014 | Kim |
| 2015/0098516 A1 | 4/2015 | Wang |
| 2015/0208386 A1* | 7/2015 | Yang .................. H04L 1/0076 370/329 |
| 2015/0282122 A1 | 10/2015 | Kim |
| 2015/0288497 A1 | 10/2015 | Li |
| 2015/0318909 A1* | 11/2015 | Zhang ................. H04B 7/0413 375/267 |

FOREIGN PATENT DOCUMENTS

| | | |
|---|---|---|
| CN | 102308636 A | 1/2012 |
| CN | 103634085 A | 3/2014 |
| CN | 103916213 A | 7/2014 |
| EP | 2 890 023 A1 | 7/2015 |
| WO | 2013144361 A1 | 10/2013 |
| WO | 2013185320 A1 | 12/2013 |
| WO | 2014032566 A1 | 3/2014 |
| WO | 2014069821 A1 | 5/2014 |
| WO | 2014094916 A1 | 6/2014 |

* cited by examiner

DEVICE OF REPORTING CONTROL INFORMATION

CROSS REFERENCE TO RELATED APPLICATIONS

This application claims the benefit of U.S. Provisional Application No. 62/076,484, filed on Nov. 7, 2014 and incorporated herein by reference.

BACKGROUND OF THE INVENTION

1. Field of the Invention

The present invention relates to a communication device used in a wireless communication system, and more particularly, to a communication device for reporting control information in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

In addition, a massive antenna array may be implemented by using a two-dimension (2D) antenna array, and three-dimension (3D) beamforming can be realized. Accordingly, signal energy can be focused on a desired direction, and the performance of the wireless communication system can be improved. A size of the 2D antenna array is usually large, and the number of antenna ports of the 2D antenna array can be 16, 32, 64, etc. The UE may need to report a large amount of control information (e.g., channel state information) to the eNB, such that the eNB can operate the 2D antenna array accurately (i.e., with a better performance). However, a capacity of UL control channels is usually limited, and may not be sufficient for transmitting all the control information. The transmission of the control information is thus a challenge when the 2D antenna array is realized.

Thus, efficient reporting of the control information is an important topic to be discussed.

SUMMARY OF THE INVENTION

The present invention therefore provides a communication device for reporting control information to solve the abovementioned problem.

A communication device for reporting control information comprises a storage unit for storing instructions and a processing means coupled to the storage unit. The processing means is configured to execute the instructions stored in the storage unit. The instructions comprise receiving a first period for transmitting first antenna array dimension precoding information from a network; and receiving a second period for transmitting second antenna array dimension precoding information from the network, wherein the first period is different from the second period.

A communication device for reporting control information comprises a storage unit for storing instructions and a processing means coupled to the storage unit. The processing means is configured to execute the instructions stored in the storage unit. The instructions comprise transmitting a first one of first antenna array dimension precoding information and second antenna array dimension precoding information periodically to a network; and transmitting a second one of the first antenna array dimension precoding information and the second antenna array dimension precoding information aperiodically to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
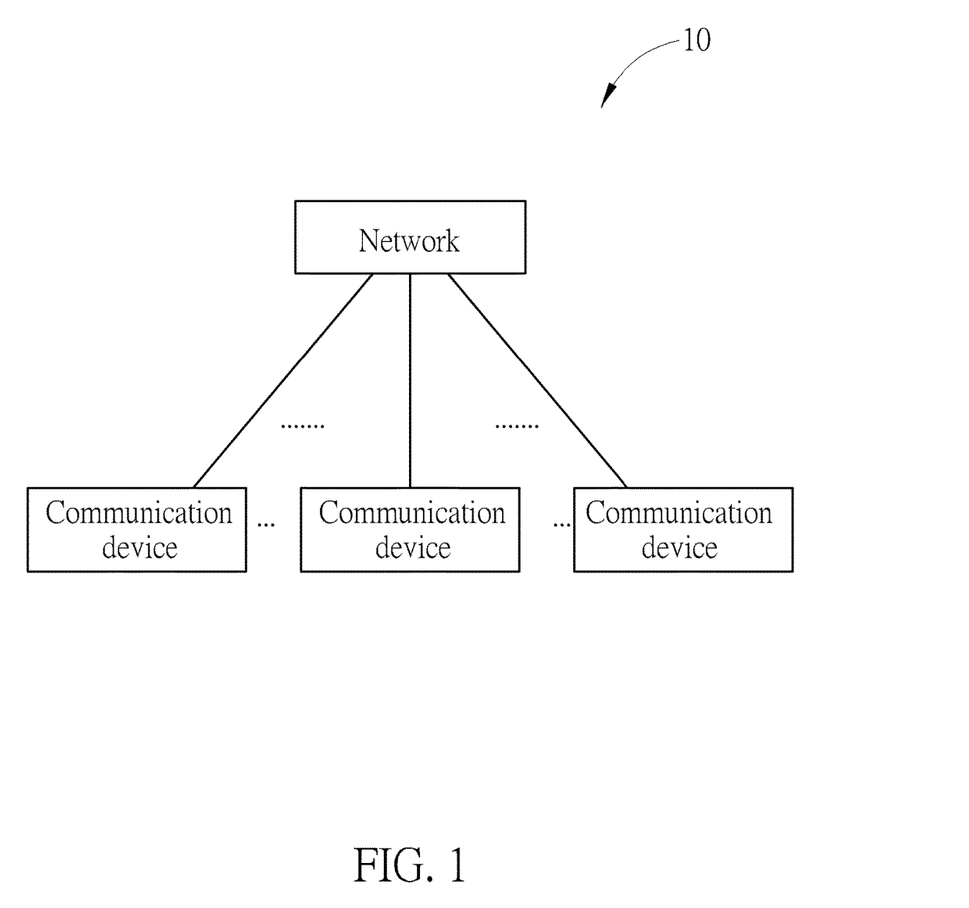
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

The network and the communication device may communicate with each other via multiple antennas. For example, a massive antenna array realized by using a two-dimension (2D) antenna array (e.g., 2D rectangular antenna array) may be supported by the network and the communication device. Thus, the communication device may need to feed back control information (e.g., channel state information) for the network to operate the 2D antenna array accurately according to the control information.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
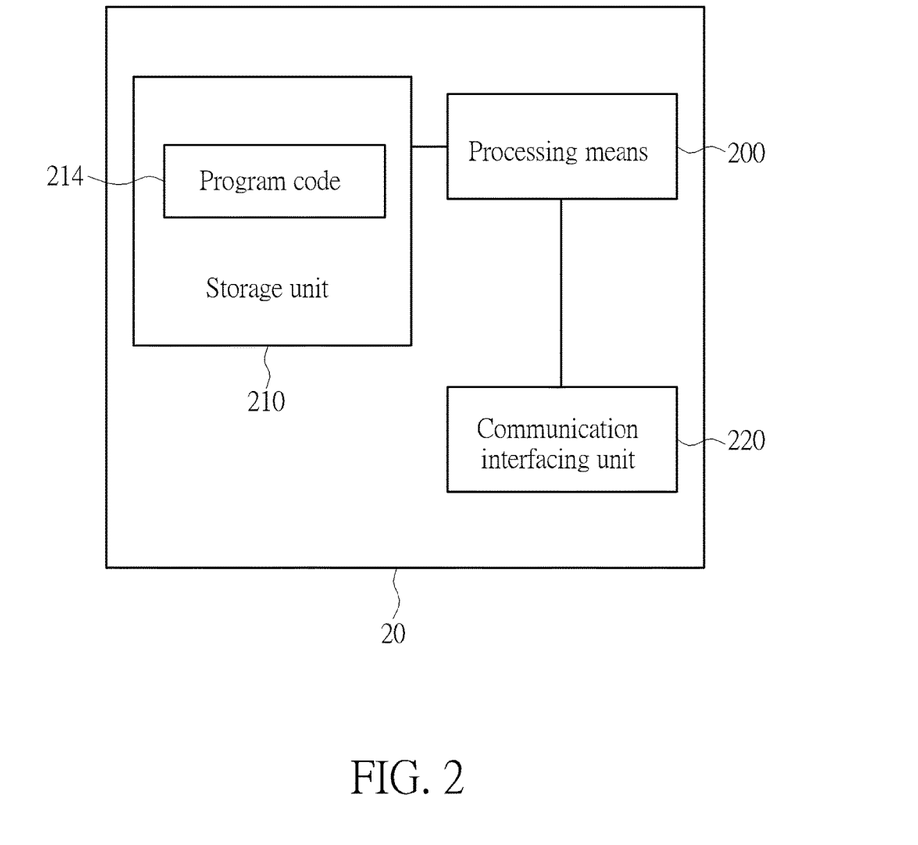
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
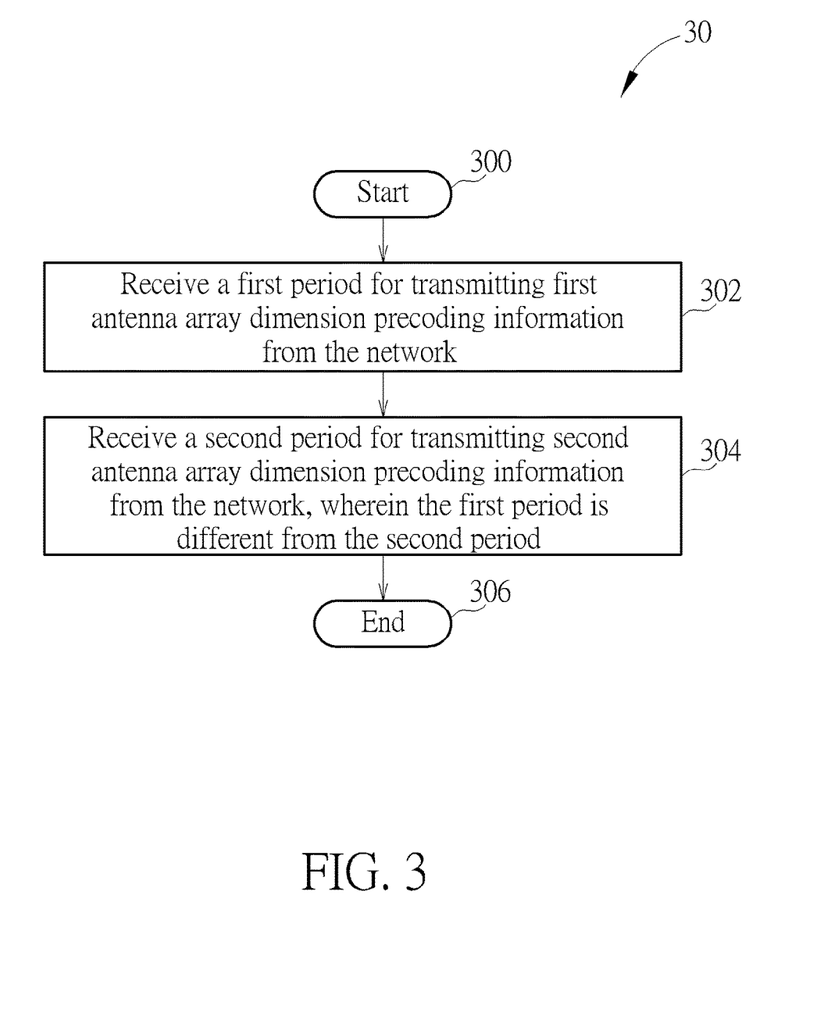
FIG. 3 is a flowchart of a process according to an example of the present invention.

FIG. 3 is a flowchart of a process 30 according to an example of the present invention. The process 30 may be utilized in a communication device shown in FIG. 1, to report control information to the network (e.g., eNB). The process 30 may be compiled into the program code 214 and includes the following steps:

Step 300: Start.

Step 302: Receive a first period for transmitting first antenna array dimension precoding information from the network.

Step 304: Receive a second period for transmitting second antenna array dimension precoding information from the network, wherein the first period is different from the second period.

Step 306: End.

According to the process 30, the communication device may receive a first period for transmitting first antenna array dimension precoding information (e.g., vertical precoding information) from the network. The communication device may further receive a second period for transmitting second antenna array dimension precoding information (e.g., horizontal precoding information) from the network, wherein the first period is different from the second period. That is, the first antenna array dimension precoding information and the second antenna array dimension precoding information may be transmitted periodically with different periods. In on example, the first period may be greater than the second period. That is, the first antenna array dimension precoding information may be transmitted less frequently than the second antenna array dimension precoding information. The reason is that the first antenna array dimension precoding information may be related vertical movements of the communication device which usually occur less frequently, while the second antenna array dimension precoding information may be related to horizontal movements of the communication device which usually occur more frequently. In other words, the first antenna array dimension precoding information and the second antenna array dimension precoding information can be measured and reported based on their characteristics. Thus, resources for transmitting the above information are used efficiently.

Realization of the process 30 is not limited to the above description.

In one example, the communication device in the process 30 may transmit the first antenna array dimension precoding information to the network according to the first period, and may transmit the second antenna array dimension precoding information to the network according to the second period. That is, the communication device transmits the first antenna array dimension precoding information and the second antenna array dimension precoding information periodically according the corresponding periods. In one example, the communication device may transmit the first antenna array dimension precoding information to the network according to the first period and a first time instant, and may transmit the second antenna array dimension precoding information to the network according to the second period and a second time instant, wherein the first time instant and the second time instant are different. That is, the first antenna array dimension precoding information and the second antenna array dimension precoding information are not only transmitted periodically according the corresponding periods, but are also transmitted at different time instants.

In one example, the communication device in the process 30 may receive a third period for transmitting the first antenna array dimension precoding information from the network, and may transmit the first antenna array dimension precoding information to the network according to the third period. That is, the period for transmitting the first antenna array dimension precoding information may be updated according to an indication transmitted by the network. Similarly, the communication device may receive a fourth period for transmitting the second antenna array dimension precoding information from the network, and may transmit the first antenna array dimension precoding information to the network according to the fourth period. That is, the period for transmitting the second antenna array dimension precoding information may also be updated according to an indication transmitted by the network.

In one example, the first period and the second period in the process 30 may be received in a control signal. That is, the periods may be received in a single message. In another example, the periods may be received in separate messages. In one example, the first antenna array dimension precoding information and the second antenna array dimension precoding information may be used for a vertical antenna array dimension and a horizontal antenna array dimension of a two-dimension (2D) antenna array (e.g., a massive antenna array), respectively. In one example, the first antenna array dimension precoding information and the second antenna array dimension precoding information may be for a horizontal antenna array dimension and a vertical antenna array dimension of a 2D antenna array, respectively. In one example, the first antenna array dimension precoding information and the second antenna array dimension precoding information may be corresponding to a first matrix and a second matrix, respectively, and the first matrix and the second matrix comprise a plurality of discrete Fourier transform (DFT) vectors. That is, the first antenna array dimension precoding information (or the second antenna array dimension precoding information) may be represented by a matrix consisting of one or more DFT vectors.

Figure 4:
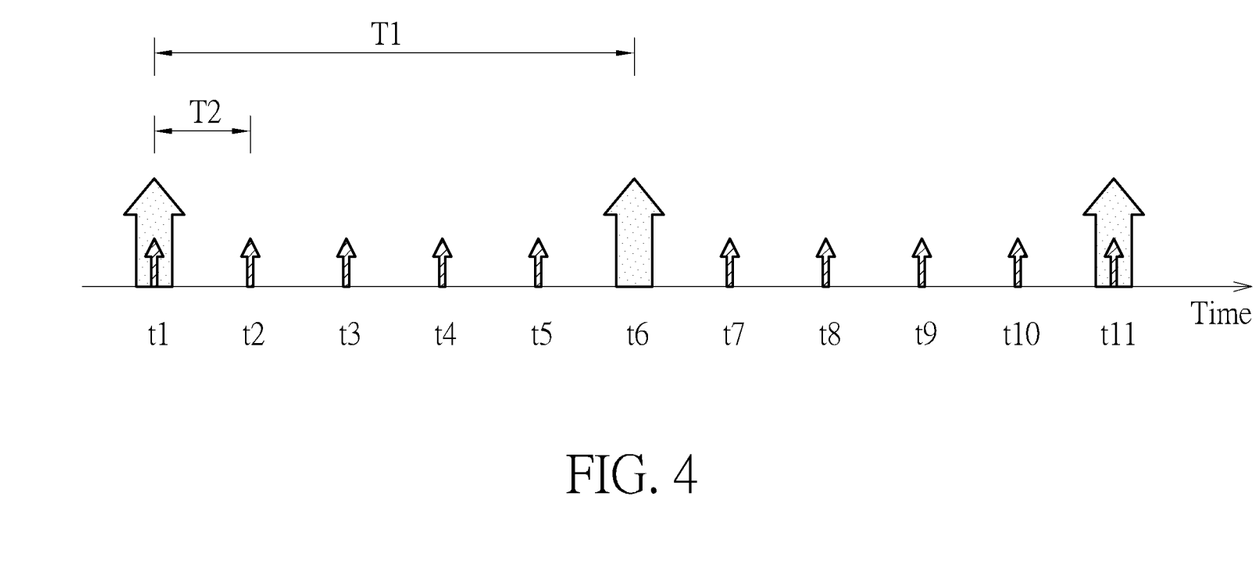
FIG. 4 is a schematic diagram of reporting of control information according to an example of the present invention.

FIG. 4 is a schematic diagram of reporting of control information according to an example of the present invention. In FIG. 4, a UE transmits the first antenna array dimension precoding information and the second antenna array dimension precoding information to an eNB at time instants t1-t11. In detail, the second antenna array dimension precoding information is transmitted at the time instants t1-t5 and t7-t11, and the first antenna array dimension precoding information is transmitted at the time instants t1, t6, and t11. The first antenna array dimension precoding information is transmitted periodically according to a period T1, and the second antenna array dimension precoding information is transmitted periodically according to a period T2. As can be seen, the first antenna array dimension precoding information and the second antenna array dimension precoding information are reported according to different periods and maybe also different time instants.

It should be noted that although the examples are illustrated based on the process 30, to clarify the operations of the communication device. The examples can be combined and/or modified arbitrarily according to system requirements and/or design considerations.

Figure 5:
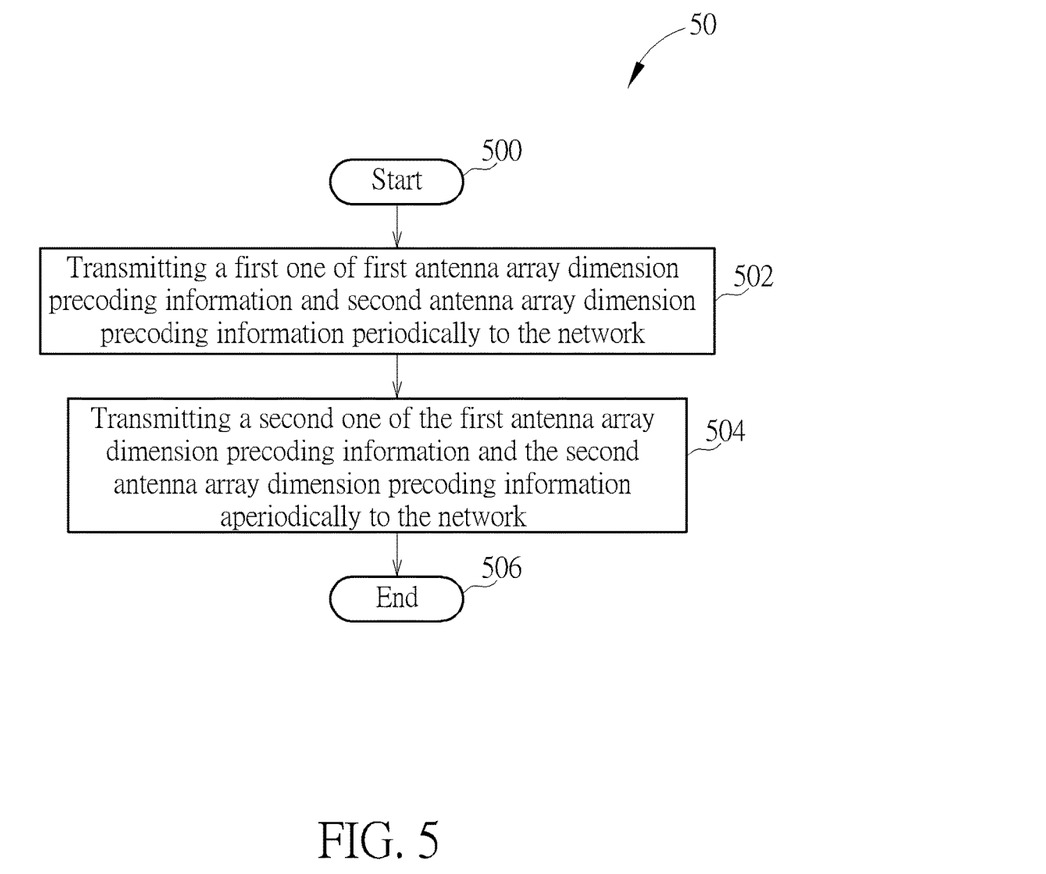
FIG. 5 is a flowchart of a process according to an example of the present invention.

FIG. 5 is a flowchart of a process 50 according to an example of the present invention. The process 50 may be utilized in a communication device shown in FIG. 1, to report control information to the network (e.g., eNB). The process 50 may be compiled into the program code 214 and includes the following steps:

Step 500: Start.

Step 502: Transmitting a first one of first antenna array dimension precoding information and second antenna array dimension precoding information periodically to the network.

Step 504: Transmitting a second one of the first antenna array dimension precoding information and the second antenna array dimension precoding information aperiodically to the network.

Step 506: End.

According to the process 50, the communication device may transmit a first one of first antenna array dimension precoding information (e.g., vertical precoding information) and second antenna array dimension precoding information (e.g., horizontal precoding information) periodically to the network. The communication device may further transmit a second one of the first antenna array dimension precoding information and the second antenna array dimension precoding information aperiodically to the network. That is, the first antenna array dimension precoding information and the second antenna array dimension precoding information are transmitted according to different reporting policies. For example, the first antenna array dimension precoding information may be transmitted periodically, while the second antenna array dimension precoding information may be transmitted aperiodically. In another example, the second antenna array dimension precoding information may be transmitted periodically, while the first antenna array dimension precoding information may be transmitted aperiodically. Thus, resources for transmitting the above information can be used efficiently according to different policies.

Realization of the process 50 is not limited to the above description.

In one example, the communication device in the process 50 may receive a control signal transmitted by the network, and may transmit the second one of the first antenna array dimension precoding information and the second antenna array dimension precoding information according to the control signal. That is, the transmission may be triggered by the network. In another example, the communication device may transmit the second one of the first antenna array dimension precoding information and the second antenna array dimension precoding information, when an event occurs, e.g., a predetermined condition is satisfied. As an example, the communication device may perform the transmission, when a measured CQI is lower than a predetermined level. In one example, the first antenna array dimension precoding information and the second antenna array dimension precoding information may be used for a vertical antenna array dimension and a horizontal antenna array dimension of a 2D antenna array (e.g., a massive antenna array), respectively. In one example, the first antenna array dimension precoding information and the second antenna array dimension precoding information may be for a horizontal antenna array dimension and a vertical antenna array dimension of a 2D antenna array, respectively. In one example, the first antenna array dimension precoding information and the second antenna array dimension precoding information may be corresponding to a first matrix and a second matrix, respectively, and the first matrix and the second matrix comprise a plurality of DFT vectors. That is, the first antenna array dimension precoding information (or the second antenna array dimension precoding information) may be represented by a matrix consisting of one or more DFT vectors.

Channels where the first antenna array dimension precoding information and/or the first antenna array dimension precoding information in the process 50 is transmitted are not limited. In one example, the first one of the first antenna array dimension precoding information and the first antenna array dimension precoding information may be transmitted in a physical UL control channel (PUCCH) to the network. In one example, the second one of the first antenna array dimension precoding information and the second antenna array dimension precoding information is transmitted in a physical UL shared channel (PUSCH) to the network.

Figure 6:
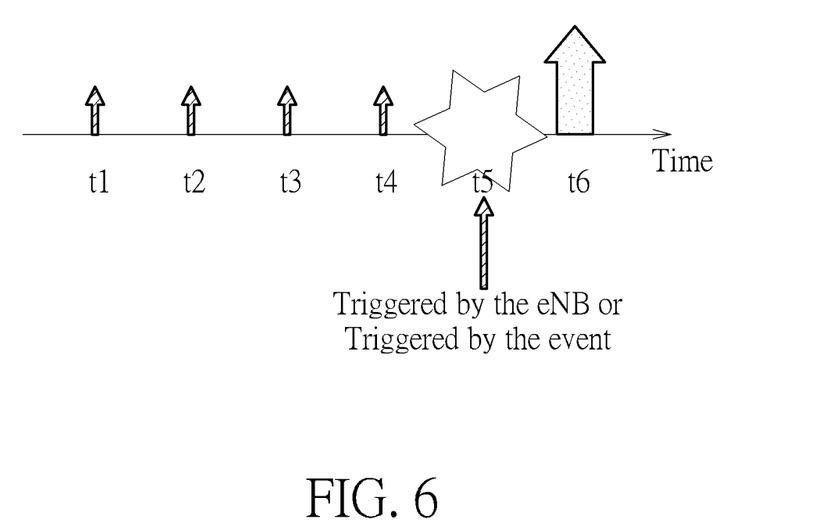
FIG. 6 is a schematic diagram of reporting of control information according to an example of the present invention.

FIG. 6 is a schematic diagram of reporting of control information according to an example of the present invention. In FIG. 6, a UE transmits second antenna array dimension precoding information periodically to an eNB at time instants t1-t4 according to a period T1. The UE may be triggered by the eNB or an event at a time instant t5. Then, the UE may transmit first antenna array dimension precoding information aperiodically at a time instant t6. As can be seen, the second antenna array dimension precoding information is transmitted periodically, while the first antenna array dimension precoding information is transmitted aperiodically.

The description related to FIG. 6 can be summarized in to process 70 and 80 in FIGS. 7 and 8, which are illustrated as follows.

Figure 7:
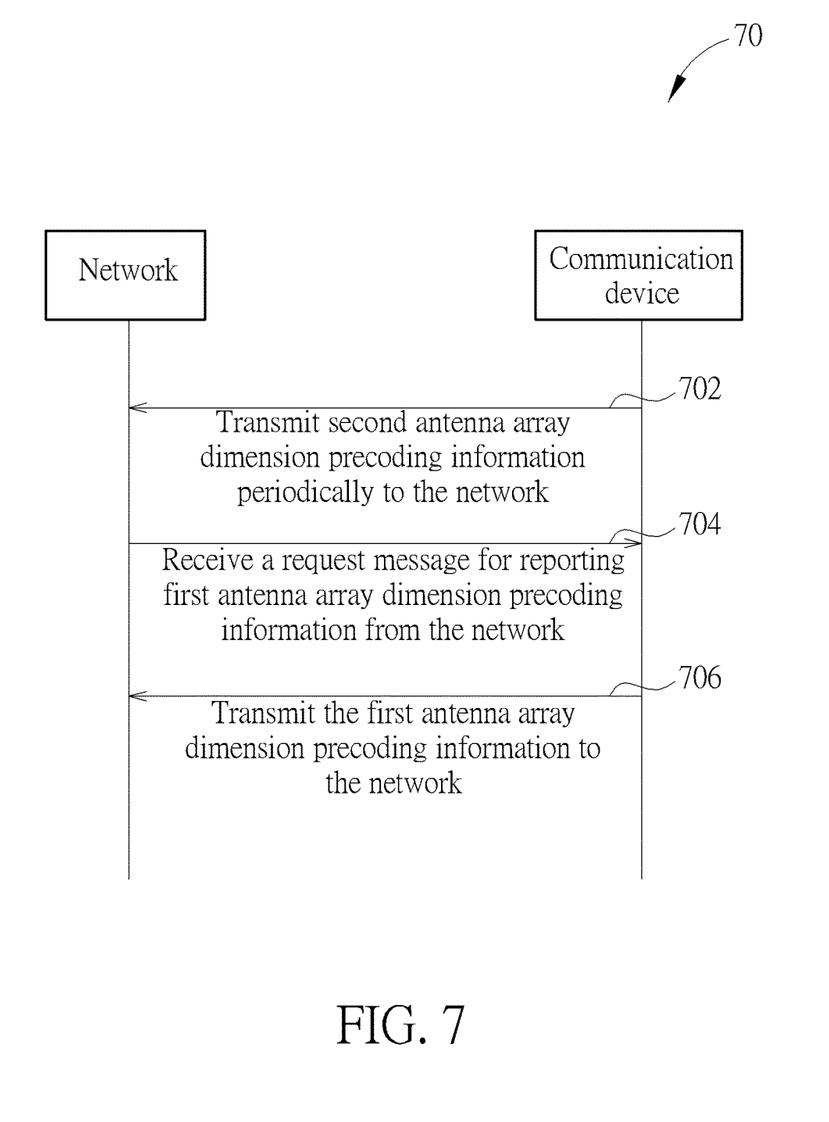
FIG. 7 is a flowchart of a process according to an example of the present invention.

FIG. 7 is a flowchart of a process 70 according to an example of the present invention. The process 70 may be utilized in a communication device shown in FIG. 1, to report control information to the network (e.g., eNB). The process 70 may be compiled into the program code 214 and includes the following steps:

Step 702: Transmit second antenna array dimension precoding information periodically to the network.

Step 704: Receive a request message for reporting first antenna array dimension precoding information from the network.

Step 706: Transmit the first antenna array dimension precoding information to the network.

According to the process 70, the communication device may transmit second antenna array dimension precoding information periodically to the network. The communication device may receive a request message for reporting first antenna array dimension precoding information from the network. Accordingly, the communication device may transmit the first antenna array dimension precoding information to the network. That is, the communication device transmits the first antenna array dimension precoding information, if the reporting of the first antenna array dimension precoding information is triggered by the network.

Figure 8:
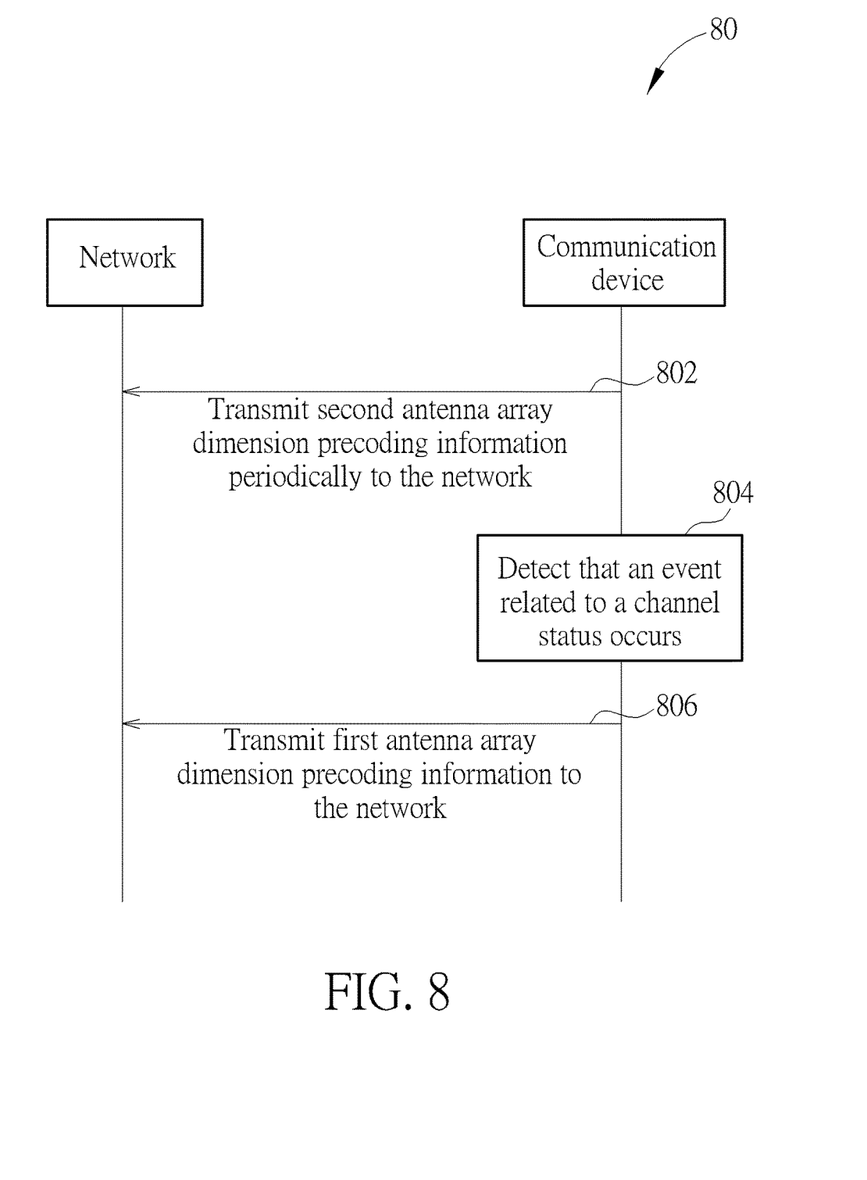
FIG. 8 is a flowchart of a process according to an example of the present invention.

FIG. 8 is a flowchart of a process 80 according to an example of the present invention. The process 80 may be utilized in a communication device shown in FIG. 1, to report control information to the network (e.g., eNB). The process 80 may be compiled into the program code 214 and includes the following steps:

Step 802: Transmit second antenna array dimension precoding information periodically to the network.

Step 804: Detect that an event related to a channel status occurs.

Step 806: Transmit first antenna array dimension precoding information to the network.

According to the process 80, the communication device may transmit second antenna array dimension precoding information periodically to the network. The communication device may detect that an event related to a channel status occurs. For example, a latest CQI is smaller than a predetermined level. Accordingly, the communication device may transmit first antenna array dimension precoding information to the network. That is, the communication device transmits the first antenna array dimension precoding information, if the reporting of the first antenna array dimension precoding information is triggered by the event.

It should be noted that although the examples are illustrated based on the process 50, to clarify the operations of the communication device. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method for reporting control information for a massive antenna array. The resource of transmitting the control information can be used efficiently according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for reporting control information, comprising:
   a storage device for storing instructions of:
   receiving, by a communication interfacing device, a first period for transmitting first antenna array dimension precoding information from a network; and
   receiving, by the communication interfacing device, a second period for transmitting second antenna array dimension precoding information from the network, wherein the first period is different from the second period;
   transmitting, by the communication interfacing device, the first antenna array dimension precoding information to the network according to the first period and a first time instant;

transmitting, by the communication interfacing device, the second antenna array dimension precoding information to the network according to the second period and a second time instant, wherein the first time instant and the second time instant are different;

receiving, by the communication interfacing device, a third period for transmitting the first antenna array dimension precoding information from the network; and transmitting, by the communication interfacing device, the first antenna array dimension precoding information to the network according to the third period;

wherein the first antenna array dimension precoding information is related to vertical movements of the communication device, and the second antenna array dimension precoding information is related to horizontal movements of the communication device;

wherein the vertical movements of the communication device occur less frequently than the horizontal movements of the communication device; and a processing circuit, coupled to the storage device, configured to execute the instructions stored in the storage device.

2. The communication device of claim 1, wherein the storage device further stores the instruction of:

transmitting, by the communication interfacing device, the first antenna array dimension precoding information to the network according to the first period; and transmitting, by the communication interfacing device, the second antenna array dimension precoding information to the network according to the second period.

3. The communication device of claim 1, wherein the storage device further stores the instruction of:

receiving, by the communication interfacing device, a fourth period for transmitting the second antenna array dimension precoding information from the network; and transmitting, by the communication interfacing device, the second antenna array dimension precoding information to the network according to the fourth period.

4. The communication device of claim 1, wherein the first period and the second period are received in a control signal.

5. The communication device of claim 1, wherein the first antenna array dimension precoding information and the second antenna array dimension precoding information are for a vertical antenna array dimension and a horizontal antenna array dimension of a two-dimension (2D) antenna array, respectively.

6. The communication device of claim 1, wherein the first antenna array dimension precoding information and the second antenna array dimension precoding information are for a horizontal antenna array dimension and a vertical antenna array dimension of a 2D antenna array, respectively.

7. The communication device of claim 1, wherein the first antenna array dimension precoding information and the second antenna array dimension precoding information are corresponding to a first matrix and a second matrix, respectively, and the first matrix and the second matrix comprise a plurality of discrete Fourier transform (DFT) vectors.

8. The communication device of claim 1, wherein the first period is greater than the second period.

* * * * *